United States Patent
Wolfe, Jr.

(10) Patent No.: US 8,590,103 B2
(45) Date of Patent: Nov. 26, 2013

(54) VACUUM CLEANER WITH REMOVABLE BATTERY PACK

(75) Inventor: Melvin E. Wolfe, Jr., Kirkwood, NY (US)

(73) Assignee: Shop Vac Corporation, Williamsport, PA (US)

( * ) Notice: Subject to any disclaimer, the term of this patent is extended or adjusted under 35 U.S.C. 154(b) by 267 days.

(21) Appl. No.: 13/253,626

(22) Filed: Oct. 5, 2011

(65) Prior Publication Data

US 2013/0086770 A1    Apr. 11, 2013

(51) Int. Cl.
*A47L 9/22* (2006.01)

(52) U.S. Cl.
USPC .......................................... 15/412; 15/DIG. 1

(58) Field of Classification Search
USPC ............................................. 15/412, DIG. 1
IPC ......................................................... A47L 9/22
See application file for complete search history.

(56) References Cited

U.S. PATENT DOCUMENTS

| | | |
|---|---|---|
| 4,821,366 A | 4/1989 | Levine |
| 5,544,274 A | 8/1996 | Walker et al. |
| 5,638,572 A | 6/1997 | Canni Ferrari |
| 5,664,285 A | 9/1997 | Melito et al. |
| 5,671,499 A | 9/1997 | Melito et al. |
| 5,699,586 A | 12/1997 | Melito et al. |
| 5,765,258 A | 6/1998 | Melito et al. |
| 6,125,501 A | 10/2000 | Yip |
| 6,546,592 B1 | 4/2003 | Cockburn et al. |
| 6,785,932 B2 | 9/2004 | Bone |
| 6,836,931 B2 | 1/2005 | Bone |
| RE40,542 E | 10/2008 | Coburn et al. |
| 2005/0251950 A1 | 11/2005 | Hsu |
| 2007/0163075 A1 | 7/2007 | Butler et al. |
| 2008/0040883 A1 | 2/2008 | Beskow et al. |
| 2010/0242209 A1 | 9/2010 | Beskow et al. |

FOREIGN PATENT DOCUMENTS

GB    2189382 A    10/1987

*Primary Examiner* — David Redding
(74) *Attorney, Agent, or Firm* — Marshall, Gerstein & Borun LLP; Randall G. Rueth

(57) ABSTRACT

A battery powered vacuum cleaner is disclosed. The vacuum cleaner comprises a motor, a battery pack comprising a plurality of battery cells arranged in a generally horseshoe configuration and wrapped about the motor, and a battery door providing access to the battery pack and adapted to permit removal of the battery pack from the vacuum cleaner.

21 Claims, 6 Drawing Sheets

VACUUM CLEANER WITH REMOVABLE BATTERY PACK

BACKGROUND OF THE INVENTION

Battery powered vacuum cleaners are known. Such vacuum cleaners are often powered by a battery pack comprising a plurality of rechargeable battery cells. The battery pack is often disposed in a handle, or other locations, of the vacuum cleaner. Because of the location of the battery pack, disassembly of the vacuum cleaner is often required to remove the battery pack from the vacuum cleaner, either to replace a failed or failing battery pack with a new battery pack, or to dispose of the battery pack separately from the vacuum cleaner in a more environmentally friendly manner. Such disassembly may make removal of the battery pack difficult.

BRIEF SUMMARY

In accordance with the disclosure, a battery powered vacuum cleaner is provided. The vacuum cleaner may comprise a vacuum cleaner housing, a motor disposed within the housing, a battery pack comprising a plurality of battery cells arranged in a generally horseshoe configuration and wrapped about the motor within the vacuum cleaner housing and a battery door providing access to the battery pack and adapted to permit removal of the battery pack from the vacuum cleaner housing.

The battery pack may include conductive tabs electrically coupling the battery cells in series. The conductive tabs may structurally couple the battery cells. The battery pack may be enclosed in a shrink-wrap covering. The battery pack may be electrically coupled to the motor by separable connectors.

The motor has an axis of rotation. The battery cells may be arranged substantially coaxial with the axis of rotation of the motor, or the battery cells may be arranged substantially perpendicular to the axis of rotation of the motor. The motor and the battery pack may be contained within a motor housing.

Other features and advantages of the invention will be apparent from the following specification taken in conjunction with the following drawings.

DETAILED DESCRIPTION OF THE INVENTION

Figure 1:
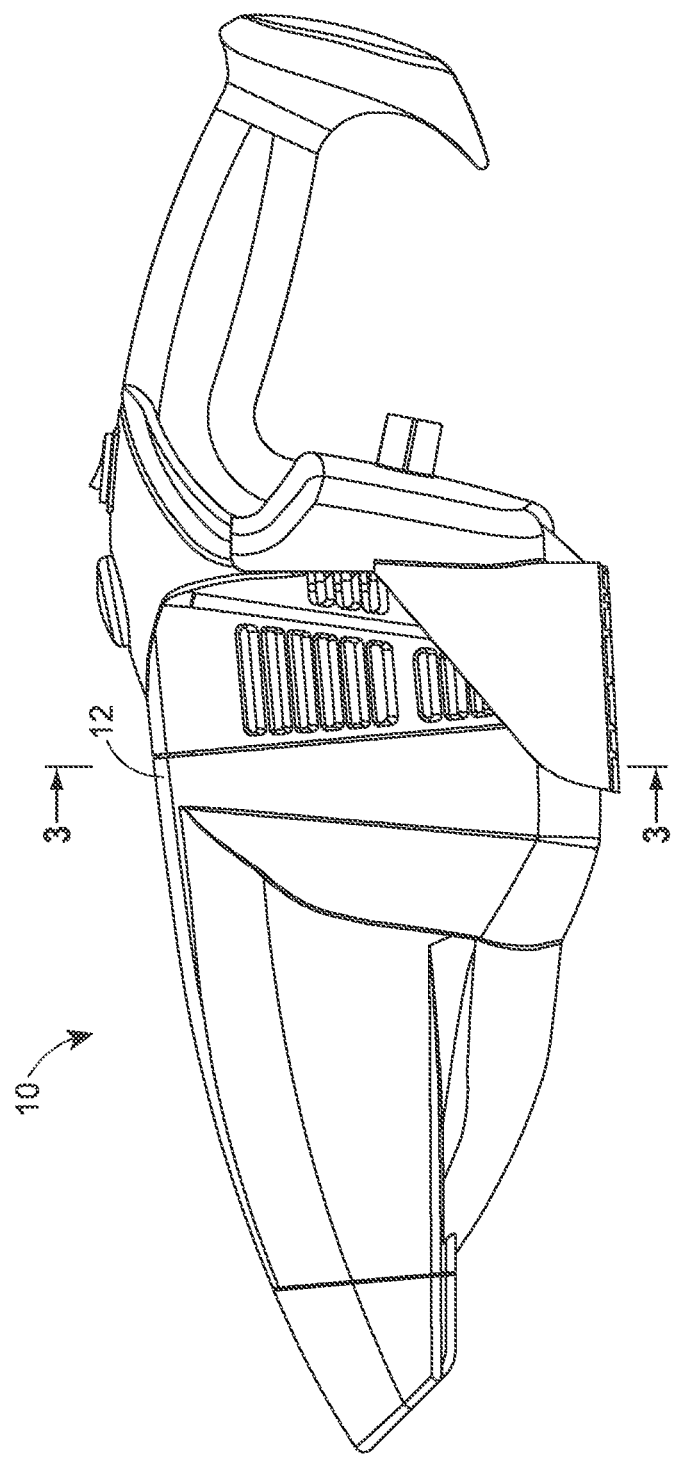
FIG. 1 is a side view of a first embodiment of a battery powered vacuum cleaner in accordance with the present invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspect of the invention to the embodiments illustrated.

Figure 2:
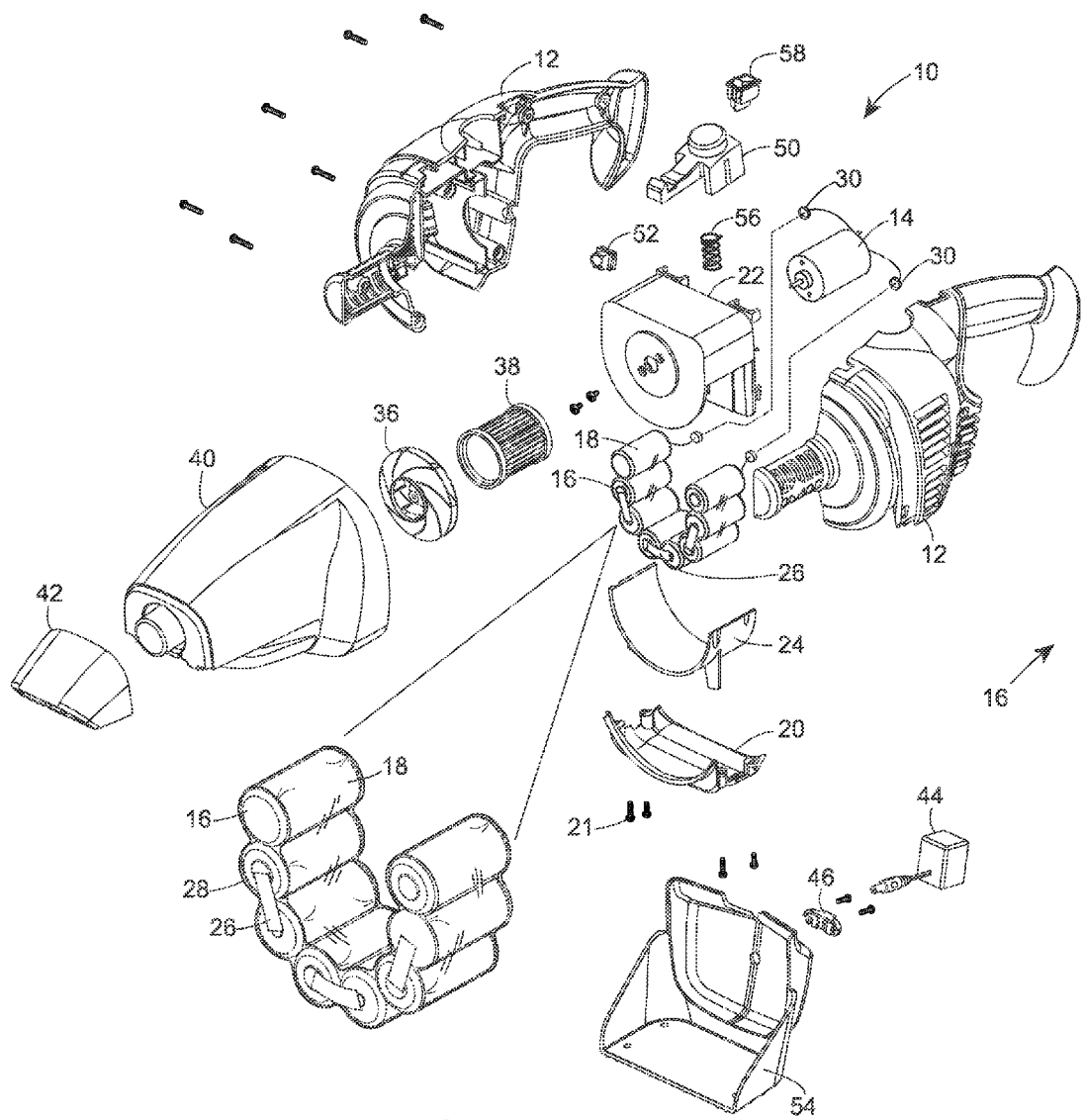
FIG. 2 is an exploded view of the vacuum cleaner of FIG. 1.
Figure 3:
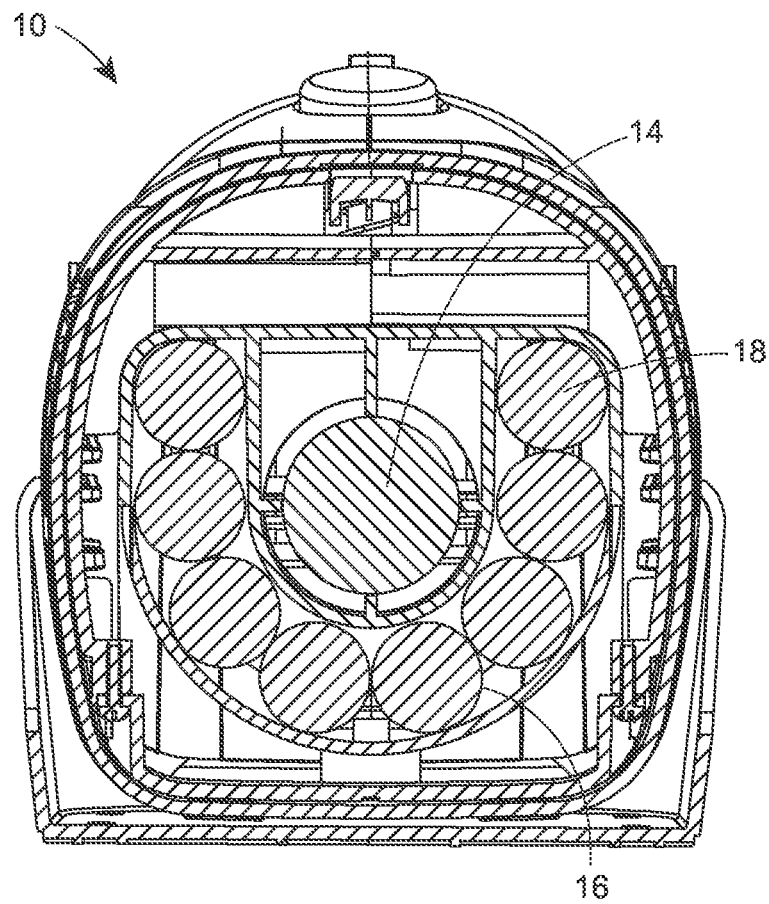
FIG. 3 is a sectional view of the vacuum cleaner of FIG. 1, taken along line 3-3 of FIG. 1.

A first embodiment of a battery powered vacuum cleaner, generally designated 10, is illustrated in FIGS. 1-3. The vacuum cleaner 10 may be a hand held portable vacuum cleaner.

The vacuum cleaner 10 may comprise a two-piece vacuum cleaner housing 12, a motor 14, such as a conventional 9.8v. motor, disposed within the housing 12, and a battery pack 16 comprising eight rechargeable battery cells 18 arranged in a generally horseshoe configuration. The motor 14 has an axis of rotation, and the battery cells 18 are arranged substantially coaxial with the axis of rotation of the motor 14. The actual number of battery cells, and thus the overall voltage of the battery pack 16, may vary, depending upon the voltage required by the particular motor.

The battery pack 16 may be wrapped about the motor 14 within the vacuum cleaner housing 12. The battery pack 16 may directly engage the motor 14. The vacuum cleaner 10 may further include a removable battery door 20, secured to the housing 12, such as by conventional screws 21. The battery door 20 may provide access to the battery pack 16 and may be adapted to permit relatively easy removal of the battery pack 16 from the vacuum cleaner housing 12. Permitting removal of the battery pack 16 permits one to remove the battery pack 16, such as to permit replacement of the battery pack 16 or to permit environmentally friendly disposal of the battery pack 16 separate from disposal of the vacuum cleaner 10 itself. The motor 14 and battery pack 16 may also be contained within a motor housing 22 and battery cover 24, which may be collectively contained within the vacuum cleaner housing 12.

The battery pack 16 may include conductive tabs 26 electrically coupling the battery cells 18 in series. The conductive tabs 26 may structurally interconnect the battery cells 18. The battery cells 18 of the battery pack 16 may also be flexibly enclosed in a unitary shrink-wrap covering 28. The battery pack 16 may be electrically coupled to the motor 14 by separable connectors 30, to permit easy separation/reattachment of the battery pack 16 from/to the motor 14.

The vacuum cleaner 10 may also include conventional vacuum cleaner components, including an impeller 36 driven by the motor 14, a filter cartridge 38, a dust housing 40 and a snout 42. The vacuum cleaner may further include a charger 44, a jacket 46, a latch 50, a recharge socket 52, a wall mounting bracket 54, a spring 56 and a motor actuating switch 58.

Figure 4:
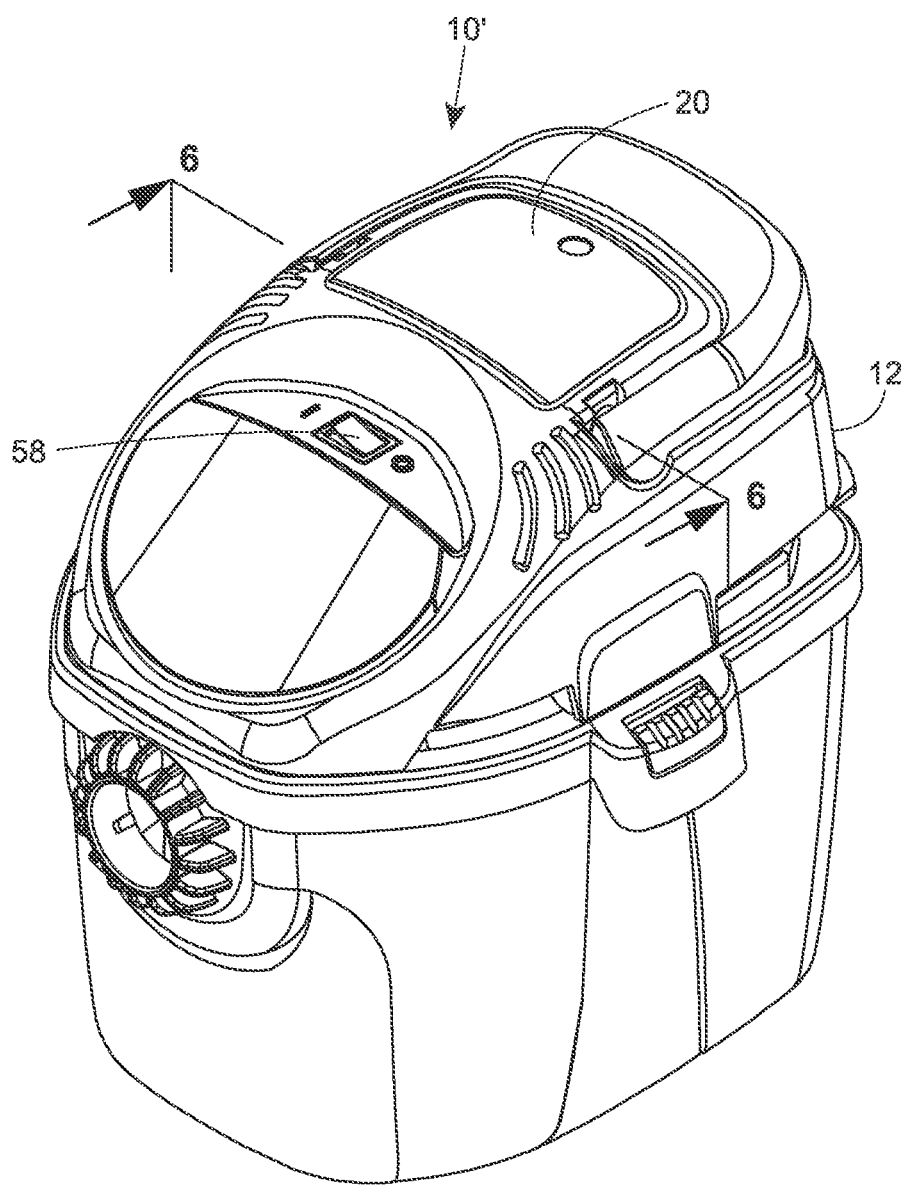
FIG. 4 is a perspective view of a second embodiment of a battery powered vacuum cleaner in accordance with the present invention.
Figure 5:
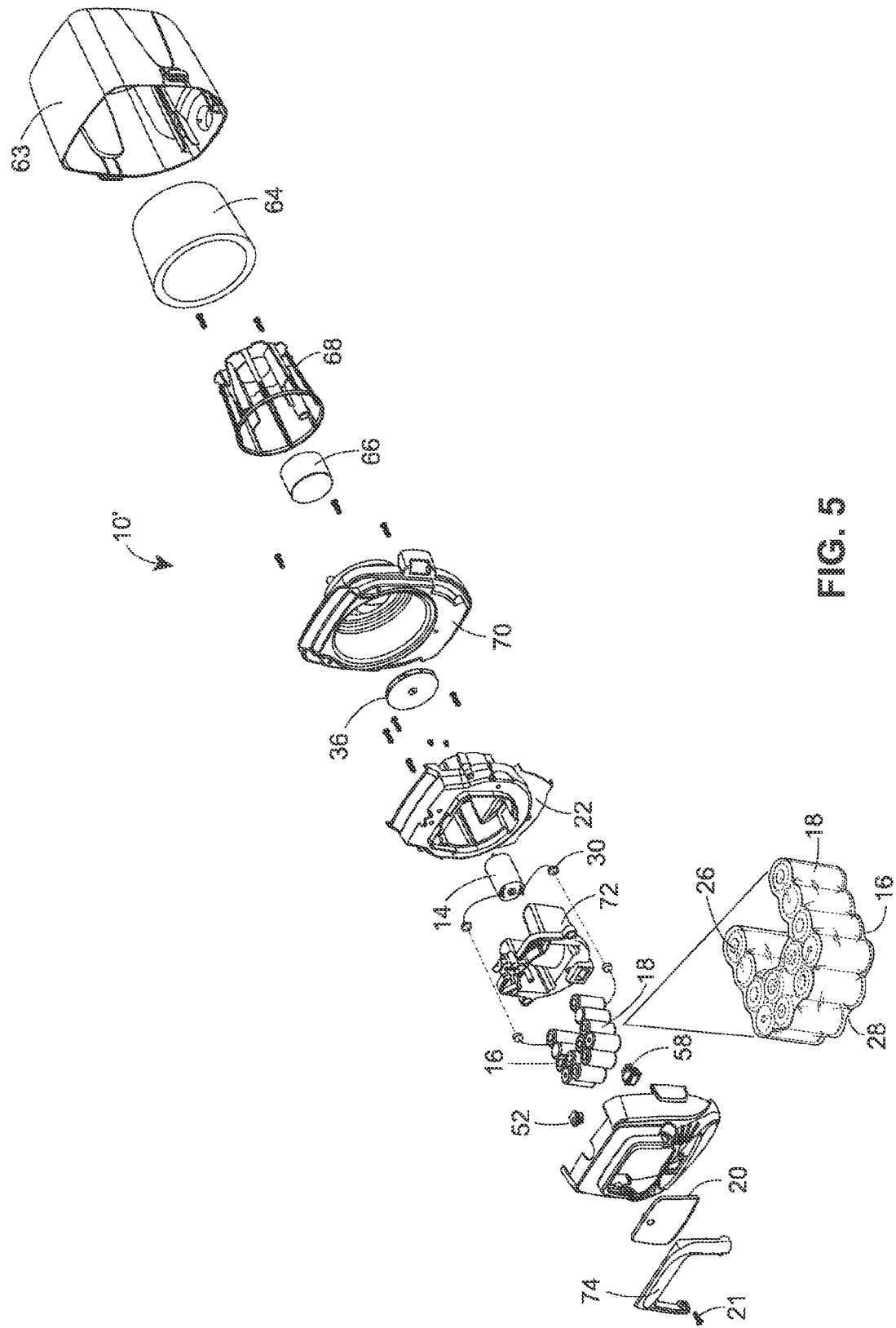
FIG. 5 is an exploded view of the vacuum cleaner of FIG. 4.
Figure 6:
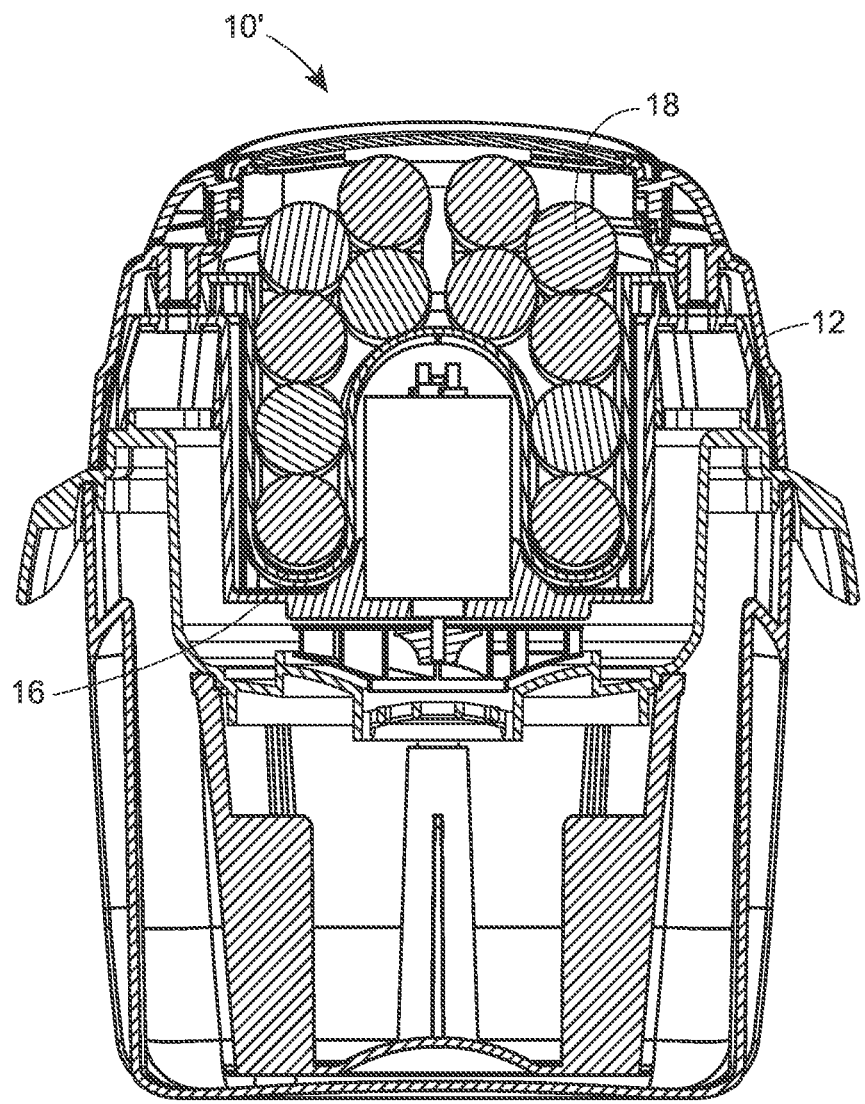
FIG. 6 is a sectional view of the vacuum cleaner of FIG. 4, taken along line 6-6 of FIG. 4.

A second embodiment of a battery powered vacuum cleaner 10' is illustrated in FIGS. 4-6. The vacuum cleaner 10' may be what is commonly referred to as a wet/dry vacuum cleaner. Components of the vacuum cleaner 10' which are functionally similar to the components of the first embodiment of the vacuum cleaner 10 are indentified with the same reference numbers.

The vacuum cleaner 10' may comprise a vacuum cleaner housing 12, a motor 14, such as a conventional 9.8v. motor, disposed within the housing 12 and a battery pack 16 comprising twelve rechargeable battery cells 18 arranged in a generally horseshoe configuration. The actual number of battery cells, and thus the overall voltage of the battery pack 16, may vary, depending upon the voltage required by the particular motor.

The battery pack 16 may be wrapped about the motor 14 within the vacuum cleaner housing 12. The battery pack 16 may directly engage the motor 14. The motor 14 has an axis of rotation, and the battery cells 18 are arranged substantially perpendicular to the axis of rotation of the motor 14. The vacuum cleaner 10 may further include a removable battery door 20, secured to the housing 12 such as by a conventional screw 21. The battery door 20 may provide access to the battery pack 16 and may be adapted to permit relatively easy removal of the battery pack 16 from the vacuum cleaner housing 12. As with the first embodiment, permitting removal of the battery pack 16 permits one to remove the battery pack 16, such as to permit replacement of the battery pack 16 or to permit environmentally friendly disposal of the battery pack 16 separate from disposal of the vacuum cleaner 10' itself. The motor 14 and battery pack 16 may also be contained within a motor housing 22 which may be contained within the vacuum cleaner housing 12.

The battery pack 16 may include conductive tabs 26 electrically coupling the battery cells 18 in series. The conductive tabs 26 may structurally interconnect the battery cells 18. The battery cells 18 of the battery pack 16 may also be flexibly enclosed in a unitary shrink-wrap covering 28. The battery pack 16 may be electrically coupled to the motor 14 by separable connectors 30, to permit easy separation/reattachment of the battery pack 16 from/to the motor 14.

The vacuum cleaner 10' may also include conventional vacuum cleaner components, including an impeller 36 driven by the motor 14 and a conventional filter cartridge (not shown). The vacuum cleaner may further include a conventional charger (not shown), a conventional recharge socket 52, and a motor actuating switch 58.

The vacuum cleaner 10' may further include a tank 63, a foam sleeve 64, a float cup 66 and a cage 68 disposed between the foam sleeve 64 and the float cup 66. The vacuum cleaner 10'may still further include a lid 70, a baffle 72 and a handle 74.

While specific embodiments have been illustrated and described, numerous modifications may come to mind without departing from the spirit of the invention. The scope of protection is only intended to be limited by the scope of the accompanying claims.

What is claimed:

1. A battery powered vacuum cleaner comprising:
   a vacuum cleaner housing;
   a motor disposed within the housing;
   a battery pack comprising a plurality of battery cells arranged in a generally horseshoe configuration and wrapped about the motor within the vacuum cleaner housing; and
   a battery door providing access to the battery pack and adapted to permit removal of the battery pack from the vacuum cleaner housing without disassembly of the vacuum cleaner housing.

2. The vacuum cleaner of claim 1 wherein the battery pack includes conductive tabs electrically coupling the battery cells in series.

3. The vacuum cleaner of claim 2 wherein the conductive tabs structurally couple the battery cells.

4. The vacuum cleaner of claim 1 wherein the battery pack is enclosed in a shrink-wrap covering.

5. The vacuum cleaner of claim 4 wherein the battery cells of the battery pack are flexibly enclosed in the shrink-wrap covering 6. The vacuum cleaner of claim 1 wherein the battery pack is electrically coupled to the motor by separable connectors.

7. The vacuum cleaner of claim 1 wherein the motor has an axis of rotation and the battery cells are cylindrical and arranged in such a way that their cylindrical axes are substantially coaxial with the axis of rotation of the motor.

8. The vacuum cleaner of claim 1 wherein the motor has an axis of rotation and the battery cells are cylindrical and arranged in such a way that their cylindrical axes are substantially perpendicular with the axis of rotation of the motor.

9. The vacuum cleaner of claim 1 wherein the motor and the battery pack are contained within a motor housing.

10. The vacuum cleaner of claim 1 wherein the battery cells are rechargeable.

11. The vacuum cleaner of claim 1 wherein the battery pack directly engages the motor.

12. A battery powered vacuum cleaner comprising:
    a vacuum cleaner housing;
    a motor disposed within the housing;
    a battery pack comprising a plurality of cylindrical battery cells arranged in a generally horseshoe configuration and wrapped about the motor within the vacuum cleaner housing, wherein the battery pack includes conductive tabs electrically structurally coupling the battery cells in series;
    a battery door providing access to the battery pack and adapted to permit removal of the battery pack from the vacuum cleaner housing without disassembly of the vacuum cleaner housing; and
    wherein the motor has an axis of rotation and the battery cells are arranged in such a way that their cylindrical axes are substantially coaxial with the axis of rotation of the motor.

13. The vacuum cleaner of claim 12 wherein the battery pack is enclosed in a shrink-wrap covering.

14. The vacuum cleaner of claim 13 wherein the battery cells of the battery pack are flexibly enclosed in the shrink-wrap covering.

15. The vacuum cleaner of claim 12 wherein the battery pack is electrically coupled to the motor by separable connectors.

16. The vacuum cleaner of claim 12 wherein the battery cells are rechargeable.

17. A battery powered vacuum cleaner comprising:
    a vacuum cleaner housing;
    a motor disposed within the housing;
    a battery pack comprising a plurality of cylindrical battery cells arranged in a generally horseshoe configuration and wrapped about the motor within the vacuum cleaner housing, wherein the battery pack includes conductive tabs electrically structurally coupling the battery cells in series;
    a battery door providing access to the battery pack and adapted to permit removal of the battery pack from the vacuum cleaner housing without disassembly of the vacuum cleaner housing; and
    wherein the motor has an axis of rotation and the battery cells are arranged in such a way that their cylindrical axes are substantially perpendicular to the axis of rotation of the motor.

18. The vacuum cleaner of claim 17 wherein the battery pack is enclosed in a shrink-wrap covering.

19. The vacuum cleaner of claim 18 wherein the battery cells of the battery pack are flexibly enclosed in the shrink-wrap covering 20. The vacuum cleaner of claim 17 wherein the battery pack is electrically coupled to the motor by separable connectors.

21. The vacuum cleaner of claim 17 wherein the battery cells are rechargeable.

* * * * *